United States Patent Office 3,166,936
Patented Jan. 26, 1965

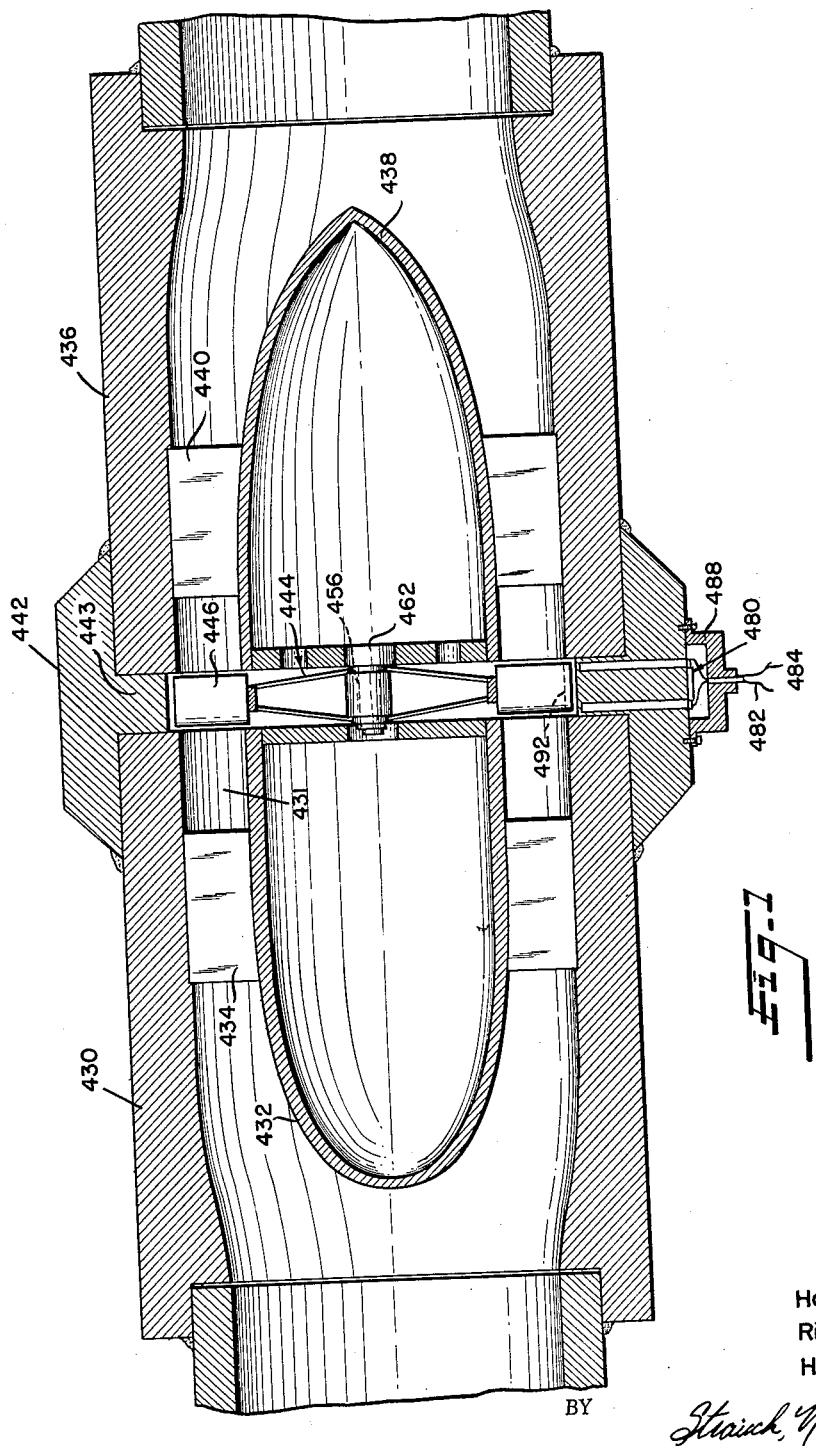

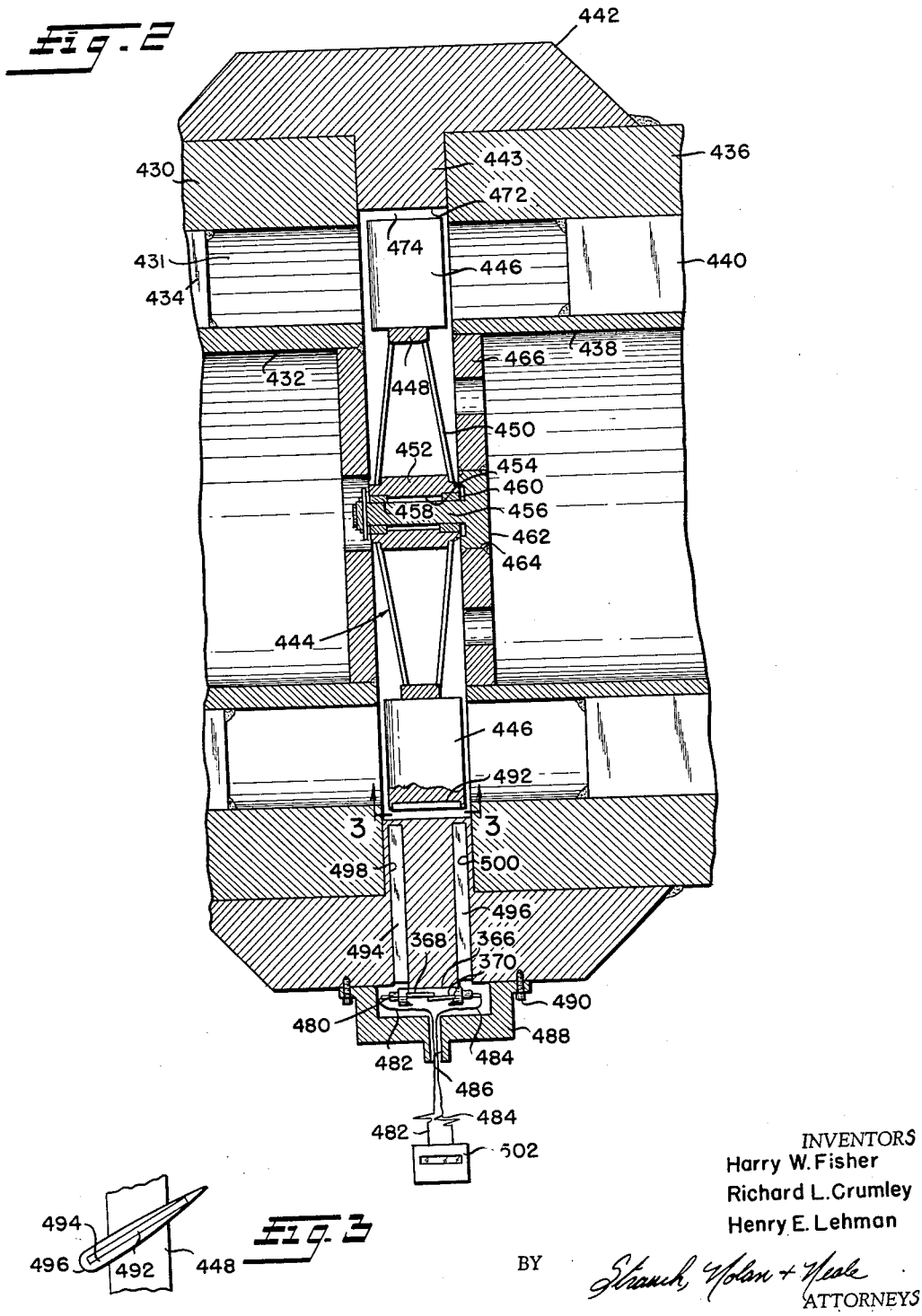

3,166,936
TURBINE FLOW METER
Harry W. Fisher, Richard L. Crumley, and Henry E. Lehman, Pittsburgh, Pa., assignors to Rockwell Manufacturing Company, Pittsburgh, Pa., a corporation of Pennsylvania
Filed Apr. 27, 1960, Ser. No. 24,942
4 Claims. (Cl. 73—231)

The present invention relates to meters and more particularly to improvements in the registration of the quantity of fluid flow through rotary meters.

This invention generally contemplates the provision of a turbine meter adapted to accurately meter and record rates of fluid flow and basically consists of a metering rotor which is rotatable in response to fluid flow therethrough and which has at least one permanent magnet mounted for rotation therewith eccentric to and in a path concentric with the rotor rotational axis. In accord with the present invention, a magnetically actuatable switch is disposed adjacent to the path of rotation of the permanent magnet and is connected to an electrical circuit so as to establish a predetermined number of electrical pulses in the circuit proportioned to the number of revolutions of the rotor. By this construction, an electrical instrumentality for registering the circuit pulses may be connected in the circuit and located at a convenient and accessible place remote from the physical situs of the meter itself.

Prior to the present invention, the registration of fluid flow rates by magnetically induced switch operated electrical pulses was only considered suitable for low velocity steady rate fluid flow conditions. For changing and high velocity conditions and particularly for conditions where the fluid being metered is subject to sudden and large variations, however, the previously known magnetically actuated switch registration apparatus did not accurately reflect the number of revolutions of the metering rotor.

With the known forms of apparatus, the intensity of the magnetic field for imparting the required energy to actuate the magnetic switch of the apparatus is not great enough to overcome the inertia of the switch components when sudden accelerations or high speeds are imparted to the metering rotor. As a consequence, the magnetic switch is not actuated when these conditions occur and the number of switch actuations, therefore, do not accurately reflect the number of rotor revolutions. Consequently, the total quantity of fluid flow is not accurately determined.

The present invention overcomes these difficulties by providing for a closed magnetic flux path that passes longitudinally through the contacts of the magnetic switch and longitudinally through the rotating permanent magnet which is of the bar type having axially aligned poles mounted eccentric to the rotational axis of the rotor and generally parallel to the longitudinal axis of the switch contact strips. By this construction, the switch contacts are longitudinally positioned in the region of the magnet field where the lines of force are drawn along a direction that is generally parallel to the axis of the permanent bar magnet. As a consequence, the intensity of the magnetic field acting to induce magnetic poles in the unmagnetized switch contact strips is sufficiently great to overcome the inertia of the strips and to move them with increased force into circuit making engagement. Thus, by virtue of this increased energy available to actuate the switch contacts, sudden accelerations or high speeds of the rotor, as is frequently encountered in turbine meter applications, do not produce a counteracting source of energy that will exceed the energy imparted by the magnetic field for actuating the switch contacts. Thus, the number of switch actuations attainable by rotation of the permanent bar magnet is accurately proportioned to the number of rotor revolutions, thereby facilitating highly accurate measurements of the total quantity of fluid flow through the meter.

In one embodiment of the invention, the turbine type fluid meter, adapted to accurately meter and register high and variable fluid flow rates, basically consists of a metering rotor which is rotatable in response to the flow of fluid through the meter and which may be adapted to be connected to a mechanical register by means of a special drive train functioning to transmit the mechanical movement of the metering rotor to the regitser. In accord with the present invention, a magnetically actuated switch mechanism is adapted to be connected to a suitable electrical instrumentality for indicating and recording the number of revolutions made by the magnetic coupling and, consequently, the number of revolutions made by the metering element to thereby provide a separate and extremely accurate registration of the quantity of fluid flowing through the meter to be recorded at a location which is remote from the physical situs of the meter itself.

Accordingly, it is a primary object of the present invention to provide a special meter magnetically actuated registration apparatus for accurately registering the quantity of fluid flow through a turbine meter.

A further object of the present invention is to provide a novel mechanism for registering the quantity or volume of fluid flow through a turbine meter wherein a permanent bar magnet is mounted for rotation in a circular path concentric with the metering rotor rotation axis and actuates a magnetically actuatable switch disposed adjacent to the path of rotation of the magnet so as to establish a predetermined number of electrical pulses proportioned to the number of revolutions of the rotor.

A further object of the present invention is to provide a turbine meter having a turbine rotor rotatable in response to fluid flow therethrough and a novel remote registration apparatus for accurately registering the number of revolutions of the rotor and including a permanent bar magnet having axially aligned poles disposed eccentric to the rotational axis of the rotor and mounted for rotation therewith, and a magnetically actuatable switch disposed adjacent to the rotational path of the magnet and paralleling the axis of the magnet so as to be actuated when the magnet rotates into the proximity of the switch contacts.

Another object of the present invention is to provide a meter according to the preceding object wherein the magnetic switch assembly is novelly supported in the meter housing.

A further object of the present invention resides in the provision of a novel turbine meter having a peripherally bladed rotor wherein a permanent bar magnet is disposed in the tip of one of the rotor blades for actuating a magnetically actuatable switch disposed adjacent to the rotational path of the magnet.

Another object of the present invention is to provide a turbine meter according to the preceding object wherein the switch is mounted exteriorly of the meter housing and a pair of soft iron cores are disposed radially between the switch and the magnet when rotated into radial alignment with the switch so as to establish a closed magnetic flux path having lines of force sequentially passing from one permanent magnetic pole, through one of the soft iron cores, through the contacts of the switch, through the other of the soft iron cores and back to the other of the permanent magnetic poles.

Further objects of the invention will presently appear as the description proceeds in connection with the appended claims and the annexed drawings wherein:

FIGURE 1 is a longitudial sectional view of a turbine meter according to a further embodiment of the present invention;

FIGURE 2 is an enlarged fragmentary longitudinal sectional view of the meter illustrated in FIGURE 1;

FIGURE 3 is a section substantially along line 3—3 of FIGURE 1.

As best shown in FIGURE 1, the axial flow turbine meter shown therein comprises a cylindrical inlet housing section 430 having a hollow faired core section 432 supported coaxially therein by spaced longitudinally extending guide vanes 434 and an outlet housing section 436 having a hollow faired core section 438 supported coaxially therein by guide vanes 440. Sections 430 and 436 are coaxially connected by means of an annular housing section 442 overlapping axially adjacent ends of sections 430 and 436 and welded or otherwise suitably fixedly secured thereto. An annular fluid flow passage is defined between the core sections and the housing. A radially inwardly extending annular shoulder 443 preferably formed integral with section 442 extends axially between the adjacent ends of sections 430 and 436 and has axially opposed flat faces in surface abutment with interfitting axial end faces of sections 430 and 436.

As is best shown in FIGURE 2, core sections 436, 438 journal a turbine rotor assembly 444 which comprises a plurality of equiangularly peripherally spaced blades 446 mounted on a rim 448 which is supported coaxially between housing sections 430 and 436 by a plurality of generally radially extending spokes 450. Blades 446 extend across the fluid flow passage. The inner ends of spokes 450 are fixed on a hollow axle hub 452 having a through bore 454 journalled on an elongated axle spindle 456 by means of sleeve bearings 458 and 460. As viewed from FIGURE 2, spindle 456 terminates at its right-hand end in an enlarged transverse end plate 462 which interfits in an aperture 464 formed coaxially with core 438 in a transverse wall partition 466 fixed to the upstream end of core 438. Plate 462 is welded or otherwise fixed to partition 466 so that spindle 456 is cantilever supported by core 438.

With continuing reference to FIGURE 2, shoulder 443 is formed with internal cylindrical peripheral wall 472 which surrounds rotor blades 446 and which forms a recess 474 with the adjacent axial end faces of housing sections 430 and 436. Recess 474 is proportioned and formed to receive the outer ends of rotor blades 446 and functions to establish fluid turbulence between blades 446 and wall 472. The fluid turbulence thus created effects a positive turbulent seal around the rotor blades 446 to substantially reduce leakage of fluid which would otherwise escape without being metered through the running clearance between blades 446 and wall surface 472 as hereinbefore described.

In order to register and record the number of revolutions of rotor assembly 444, a magnetically actuated switch 480 is mounted on the housing. This switch comprises a pair of flexible non-permanently magnetizable contact strips 368 and 370 projecting toward each other from suitable insulated supports and with their inner ends in lightly overlapping relationship. The outer ends of strips 368 and 370 are connected as by soldering to electrical leads 482 and 484 which extend to remote register 502.

Switch 480 is suitably secured to the outer periphery of housing section 442 and the contact strip leads 482 and 484 extending away therefrom are received through an aperture 486 provided in a cover plate 488 which houses switch 480 and which is secured to housing section 442 as by screws 490. In order to actuate switch 480, a permanently magnetized bar magnet 492 is interfittingly received in a recess 494 (FIG. 3) formed in the tip of one of the turbine blades 446, and generally paralleling the meter longitudinal axis. Switch 480 is positioned with its contacts 368 and 370 paralleling the axis of magnet 492 and concentrically outwardly of magnet 492. By means of this magnetic switch construction, it will be appreciated that contacts 368 and 370 of switch 480 will be actuated by the magnetic flux induced by magnet 492 as turbine rotor 444 is rotated.

In order to transmit the magnetic lines of force more efficiently through the thickness of the housing section 442 which is preferably made of stainless steel, soft iron bar-shaped cores 494 and 496 are disposed radially between switch 480 and magnet 492 and are received in axially spaced apart radially extending blind bores 498 and 500 formed in housing section 442. By this structure, cores 494 and 496 together with switch 480 and bar magnet 492 provide a closed generally circular path for the magnetic flux established by magnet 492.

Contact strips 368 and 370 extend substantially in parallel relation to longitudinal axis of the bar magnet on the rotor blade, and a closed magnetic flux path is established through the magnet, the soft iron cores and said strips whenever the blade carrying the magnet passes in radial alignment with the switch 480.

It will be appreciated that as many magnets 492 or switches 480 may be used as desired to obtain a desired number of electrical impulses for each revolution of the rotor assembly. Leads 482 and 484 are adapted to be connected to an electrical register 502 which may be remotely located from the meter for registering the electrical pulses established by actuation of switch 480.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a turbine meter having a hollow housing defining a fluid flow passage therethrough, a turbine rotor having a plurality of peripherally spaced blades mounted in said housing for rotation in response to fluid flow through said passage and having at least one permanent bar magnet carried by one of said blades for rotation therewith, a magnetically actuatable switch disposed exteriorly of said housing adjacent to the path of rotation of said magnet for actuation once during each revolution of said magnet and having at least one contact strip of non-permanent magnetizable material disposed radially outwardly of said magnet substantially in parallel relation to the longitudinal axis of said magnet, means connecting said switch to an electrical circuit, and a pair of members of non-permanent magnetizable material disposed at least partially in said housing radially between said contact strip and the rotational path of said magnet, said members being axially spaced apart relative to the rotational axis of said rotor and being operable to establish a closed magnetic flux path passing through said strip and said magnet whenever said magnet is rotated into the range of said strip.

2. The turbine meter as defined in claim 1, means providing for a recess in the tip of said one blade for receiving said permanent bar magnet, said permanent bar magnet being arranged in said recess with its poles extending in parallel spaced apart relationship with the rotational axis of said rotor.

3. In a turbine meter, a tubular metallic housing having an inlet and an outlet, a fluid flow guide structure defining a confined venturi passage of hollow form between said inlet and said outlet and comprising a central upstream core and a central downstream core, a peripherally bladed turbine rotor journalled on one of said cores and disposed between said cores with its blades extending across said passage, a bar magnet recessed in the peripheral tip of at least one of said rotor blades having generally axially aligned poles eccentric to the rotor axis and rotatable with said rotor in a circular path that is concentric to said rotor axis, at least one magnetically actuatable switch mounted exteriorly of said housing radially outwardly of and adjacent to the rotational path of said magnet and having at least one contact strip of non-permanent magnetizable material disposed substantially parallel to the axis of said magnet for actuation once during each revolution of said magnet, an electrical circuit connected to said strip and a pair of axially spaced elongate core members of non-permanent magnetizable material received interfittingly in cavities formed in said housing, said cores being disposed radially between said contact strip and the rotational path of said magnet and generally normal to said strip and being operable to establish a closed magnetic flux path passing through said magnet and said strip when said magnet is rotated into the proximity of said strip.

4. In a fluid meter, a metallic tubular flux dissipating housing having a fluid inlet and a fluid outlet disposed coaxially with said fluid inlet, a fluid flow guide structure including a pair of axially aligned core members defining a venturi passage of hollow form between said fluid inlet and said fluid outlet, a peripherally bladed metering element rotatably disposed between said core members with its blades extending across said venturi passage for movement in response to fluid flow through said passage, a magnetically actuatable switch disposed exteriorly of said housing and adapted to control an electrical circuit, non-permanent magnetizable elements spaced axially apart relative to the rotational axis of said metering element and being disposed at least partially in said housing radially between said switch and said passage for providing a confined path for magnetic flux at least partially through said housing and through said switch, said non-permanent magnetizable elements forming a gap extending into said passage, and permanent magnetic means comprising a permanent bar magnet carried by said metering element to periodically close said gap and form a closed magnetic flux path with said non-permanent magnetizable elements and said switch for periodically actuating said switch in synchronous timed relation with said metering element, said non-permanent magnetizable elements comprising a pair of generally parallel soft iron cores respectively extending from positions adjacent to the poles of said bar magnet to positions adjacent the opposed ends of said switch, and said switch having magnetically actuatable contact members extending transversely of said cores.

References Cited in the file of this patent

UNITED STATES PATENTS

| | | |
|---|---|---|
| 2,600,309 | MacDonald et al. | June 10, 1952 |
| 2,607,221 | Babson et al. | Aug. 19, 1952 |
| 2,649,712 | Dale | Aug. 25, 1953 |
| 2,882,727 | Newbold | Apr. 21, 1959 |
| 2,907,208 | Taylor | Oct. 6, 1959 |
| 3,036,460 | White et al. | May 29, 1962 |

FOREIGN PATENTS

| | | |
|---|---|---|
| 1,188,366 | France | Mar. 9, 1959 |
| 1,197,955 | France | June 8, 1959 |